(12) United States Patent
Yoshida

(10) Patent No.: US 8,079,233 B2
(45) Date of Patent: Dec. 20, 2011

(54) BURNER FOR MANUFACTURING POROUS GLASS BASE MATERIAL

(75) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/862,679

(22) Filed: Aug. 24, 2010

(65) Prior Publication Data

US 2010/0323311 A1 Dec. 23, 2010

Related U.S. Application Data

(63) Continuation of application No. PCT/JP2009/000884, filed on Feb. 27, 2009.

(30) Foreign Application Priority Data

Feb. 27, 2008 (JP) ................................ 2008-046833
Feb. 17, 2009 (JP) ................................ 2009-034224
Feb. 25, 2009 (JP) ................................ 2009-042296

(51) Int. Cl.
*C03B 37/018* (2006.01)
(52) U.S. Cl. ................................ 65/531; 65/414; 65/421
(58) Field of Classification Search ................ 65/413, 65/414, 421, 531
See application file for complete search history.

(56) References Cited

U.S. PATENT DOCUMENTS

| 4,810,189 A | 3/1989 | Mikami et al. |
| 2006/0137404 A1 | 6/2006 | Nunome et al. |

FOREIGN PATENT DOCUMENTS

| JP | 03-9047 B2 | 2/1991 |
| JP | 05-323130 A | 12/1993 |
| JP | 10-101343 A | 4/1998 |
| JP | 10-167748 A | 6/1998 |
| JP | 2000-104908 A | 4/2000 |
| JP | 2000-109328 A | 4/2000 |
| JP | 2000-327341 A | 11/2000 |

(Continued)

OTHER PUBLICATIONS

Machine Translation of JP2004-036910, performed Aug. 18, 2011.*
Written Opinion (PCT/ISA/237) issued in PCT/JP2009/000884 (parent application) mailed in Apr. 2009.

(Continued)

*Primary Examiner* — Matthew Daniels
*Assistant Examiner* — Lisa Herring
(74) *Attorney, Agent, or Firm* — Chen Yoshimura LLP

(57) ABSTRACT

The present invention provides a burner for manufacturing a porous glass base material that has small-diameter gas discharge ports and that achieves uniform linear velocity at the gas discharge ports, a uniform reaction, and a stable flame, and improved deposition efficiency. In the burner for manufacturing a porous glass base material, inner diameters of the pipes forming the gas discharge ports positioned farther inward in a radial direction than the gas discharge ports in which the small-diameter gas discharge port nozzles are arranged contract beginning from a position farther on a burner source side than the prescribed length L position, the contraction being greater closer to a burner tip side, and inner diameters of the pipes forming the gas discharge port in which the small-diameter gas discharge port nozzles are arranged and the gas discharge ports that are positioned farther outward in the radial direction than this gas discharge port contract beginning from a position farther on a burner tip side than the prescribed length L position, the contraction being greater closer to a burner tip side.

6 Claims, 14 Drawing Sheets

| | FOREIGN PATENT DOCUMENTS | |
|---|---|---|
| JP | 2001-294429 A | 10/2001 |
| JP | 2002-167223 A | 6/2002 |
| JP | 2003-165737 A | 6/2003 |
| JP | 2003-206154 A | 7/2003 |
| JP | 2003-212555 A | 7/2003 |
| JP | 2003-226544 A | 8/2003 |
| JP | 2004-36910 A | 2/2004 |
| JP | 2004-331440 A | 11/2004 |
| JP | 2006-182624 A | 7/2006 |

OTHER PUBLICATIONS

International Search Report (ISR) issued in PCT/JP2009/000884 (parent application) for Examiner consideration, citing Foreign Patent document Nos. 13-16 listed above.

Written Opinion (PCT/ISA/237) issued in PCT/JP2009/000884 (parent application). Concise Explanation of Relevance: This Written Opinion considers the claims are described by or obvious over the references Nos. 13-14 cited in ISR above.

* cited by examiner

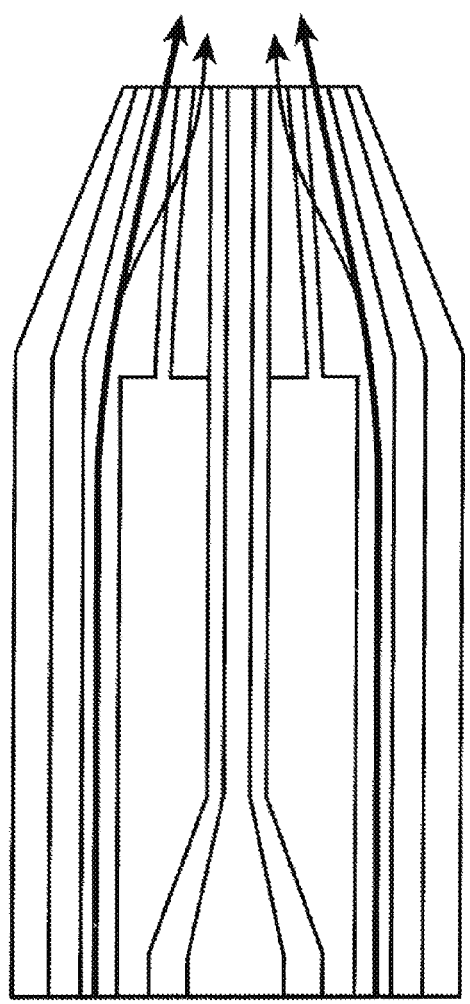
F I G . 11

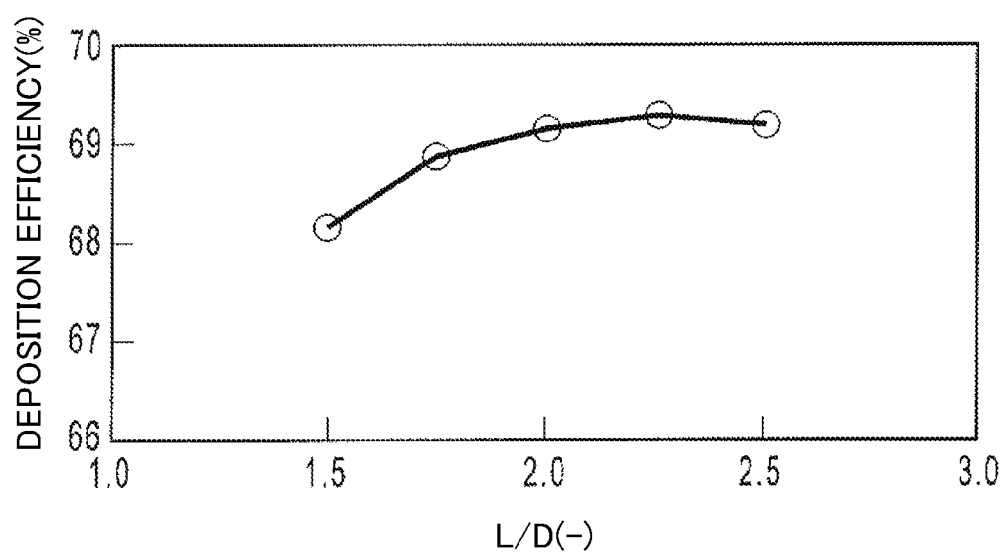
F I G . 13

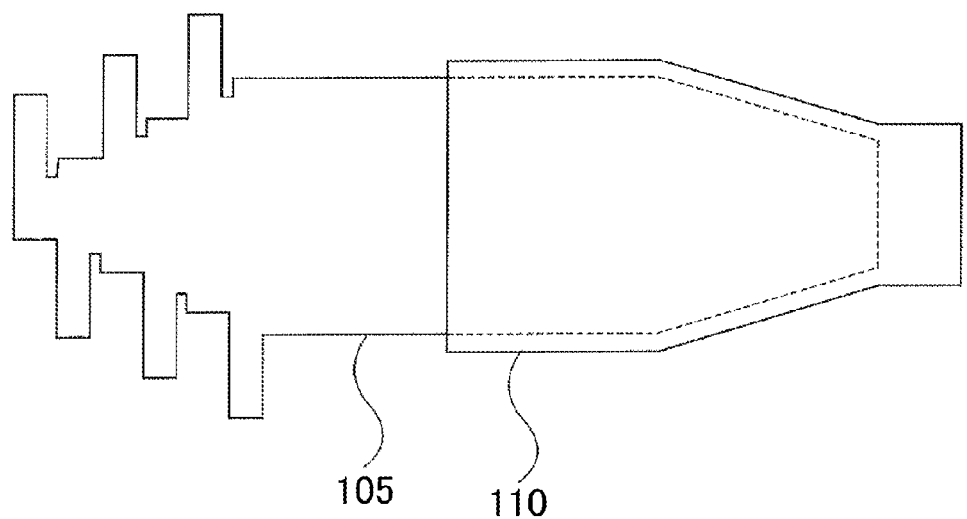
F I G . 14

BURNER FOR MANUFACTURING POROUS GLASS BASE MATERIAL

BACKGROUND

1. Technical Field

The present invention relates to a burner for manufacturing a porous glass material having good deposition efficiency.

The contents of the following Japanese patent applications are incorporated herein by reference,
No. 2008-046833 filed on Feb. 27, 2008,
No. 2009-034224 filed on Feb. 17, 2009,
No. 2009-042296 filed on Feb. 25, 2009, and
PCT/JP2009/000884 filed on Feb. 27, 2009

2. Related Art

Various conventional methods have been proposed for manufacturing an optical fiber base material. One such method is OVD (Outside Vapor Phase Deposition), which involves relatively moving the burner or a starting member back and forth to affix and deposit glass fine particles generated in the burner flame onto the rotating starting member to synthesize the porous base material, and dehydrating and sintering this base material in an electric furnace. With this method, an optical fiber base material having a relatively arbitrary refractive index distribution can be obtained and mass production of optical fiber base materials with large aperture diameters can be achieved, and so this method is commonly used.

FIG. 1 is a schematic view showing an exemplary porous glass base material manufacturing apparatus that uses the OVD method. In FIG. 1, the starting member on which the glass fine particles (soot) are deposited is realized by dummy rods 2 fused at both ends of a core rod 1, and the ends of the dummy rods 2 are supported by ingot chuck mechanisms 4 to be rotatable on an axis. The optical fiber raw material, vapor such as $SiCl_4$, and a combustion gas such as hydrogen gas and oxygen gas are blown toward the starting member from the burner 3 that moves back and forth relative to the starting member, and the optical fiber porous base material is formed by depositing on the starting member the soot generated by the hydrolysis in the oxygen flame. Here, reference numeral 5 indicates an exhaust hood.

The burner 3 is supported to move back and forth in the longitudinal direction of the starting member via a burner guide mechanism, not shown. While the starting member rotates on an axis, the burner blows the flame toward the starting member, thereby forming the porous base material by depositing glass fine particles generated by the hydrolysis of the raw material gas in the flame. Next, the porous base material is passed through a heater of a heating furnace, not shown, to become dehydrated glass, thereby forming the optical fiber base material.

In order to synthesize the glass fine particles and deposit the soot on the starting member, a burner having a plurality of coaxial pipes is conventionally used. However, such a burner is unable to generate a sufficient amount of glass fine particles, since there is insufficient mixing of the glass raw material gas, the combustion gas, and the auxiliary combustion gas. As a result, the yield cannot be increased and the high-speed synthesis becomes difficult.

In order to solve this problem, Japanese Examined Patent Application Publication No. 03-9047 proposes a multinozzle burner having a plurality of nozzles within the combustible gas discharge port that form small aperture diameter auxiliary combustion gas discharge ports arranged to surround the central raw material gas discharge port. With this type of burner, several methods for improving deposition efficiency are proposed. For example, Japanese Patent Application Publication No. 2003-206154, Japanese Patent Application Publication No. 2004-331440, Japanese Patent Application Publication No. 2006-182624, and Japanese Patent No. 3744350 propose small aperture diameter auxiliary combustion gas discharge ports. Furthermore, Japanese Patent Application Publication No. 05-323130, Japanese Patent No. 3543537, and Japanese Patent Application Publication No. 2003-226544 describe optimization of the focal distances of the small aperture diameter auxiliary combustion gas discharge ports. Japanese Patent No. 3591330, Japanese Patent Application Publication No. 2003-165737, Japanese Patent Application Publication No. 2003-212555, and Japanese Patent No. 3653902 describe optimizing the gas flow rate and gas linear velocity.

The inventors of the present invention performed a rigorous investigation of a burner for manufacturing a porous glass base material having small-diameter auxiliary combustion gas discharge ports, i.e. nozzles. As a result, it was found that the deposition efficiency is strongly linked to the configuration and focal distances of the small-diameter auxiliary combustion gas discharge ports, the gas flow rate, and the gas linear velocity. However, there have been problems such as a non-uniform reaction caused by a variation of the gas linear velocity in the gas discharge ports and disruption of the flame caused by unstable gas flow, and these problems interfere with improvements to the deposition efficiency.

Usually, the supply of a reaction gas to the burner involves disposing gas inlet pipes at certain locations near the source side of the pipes forming the gas discharge ports, and supplying the reaction gas to each gas discharge port via supply tubes connected to the gas inlet pipes. The gas supplied to the gas discharge ports is supplied from gas inlet pipes connected at certain locations in a direction orthogonal to a ring-shaped (annular) flow path, but is not supplied to the central gas discharge port. Here, since the burner is configured as multiple coaxial pipes, pipes farther outward have larger diameters, and the gas supplied from the gas inlet pipes to the ring-shaped flow path has difficulty flowing around on an opposite side of the inner pipes when these pipes are positioned farther outward. As a result, it is easy for the linear velocity in a flow path cross section of the gas discharge ports to become non-uniform.

In particular, a burner having small-diameter auxiliary combustion gas discharge ports has a group of the small-diameter auxiliary combustion gas discharge ports arranged within one gas discharge port, and so compared to a conventional burner with coaxial pipes that does not have small-diameter auxiliary combustion gas discharge ports, a variation of the linear velocity of the gas from the gas discharge ports is more likely to occur. Therefore, a method is considered for reducing linear velocity variation within the gas discharge ports by disposing a plurality of gas inlet pipes in the pipes forming the gas discharge ports, but this is difficult to realize because a large number of gas inlet pipes are necessary, resulting in a very complex configuration.

It is an object of the present invention to provide a burner for manufacturing porous glass base material that has small-diameter gas discharge ports and that can achieve uniform linear velocity, a uniform reaction, a stable flame, and improved deposition efficiency.

SUMMARY

Therefore, it is an object of an aspect of the innovations herein to provide a burner for manufacturing porous glass base material, which is capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary burner may include a burner for manufacturing porous glass base material, comprising a central pipe that is arranged centrally and has a central raw material gas discharge port formed therein; a plurality of pipes that are coaxial with the central pipe and that form annular gas discharge ports between adjacent pipes; and a plurality of small-diameter gas discharge port nozzles that (i) are arranged in one or more rows in a circle coaxial with the central pipe within one of the gas discharge ports other than the central raw material gas discharge port, (ii) have small-diameter gas discharge ports formed therein, and (iii) branch from one main pipe arranged between a pair of pipes forming the gas discharge port in which the nozzles are arranged, at a position that is a prescribed length L from tips of the nozzles, wherein inner diameters of the pipes forming the gas discharge ports positioned farther inward in a radial direction than the gas discharge ports in which the small-diameter gas discharge port nozzles are arranged contract beginning from a position farther on a burner source side than the prescribed length L position, the contraction being greater closer to a burner tip side, and inner diameters of the pipes forming the gas discharge port in which the small-diameter gas discharge port nozzles are arranged and the gas discharge ports that are positioned farther outward in the radial direction than this gas discharge port contract beginning from a position farther on a burner tip side than the prescribed length L position, the contraction being greater closer to a burner tip side.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 11 is a schematic view showing the state of the gas flow in the third pipe when the L/D ratio is low.

FIG. 13 shows the relationship between the L/D ratio and the deposition efficiency.

FIG. 14 is a schematic view showing the appearance of the burner when the burner cover is disposed outside the outermost pipe.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 7:
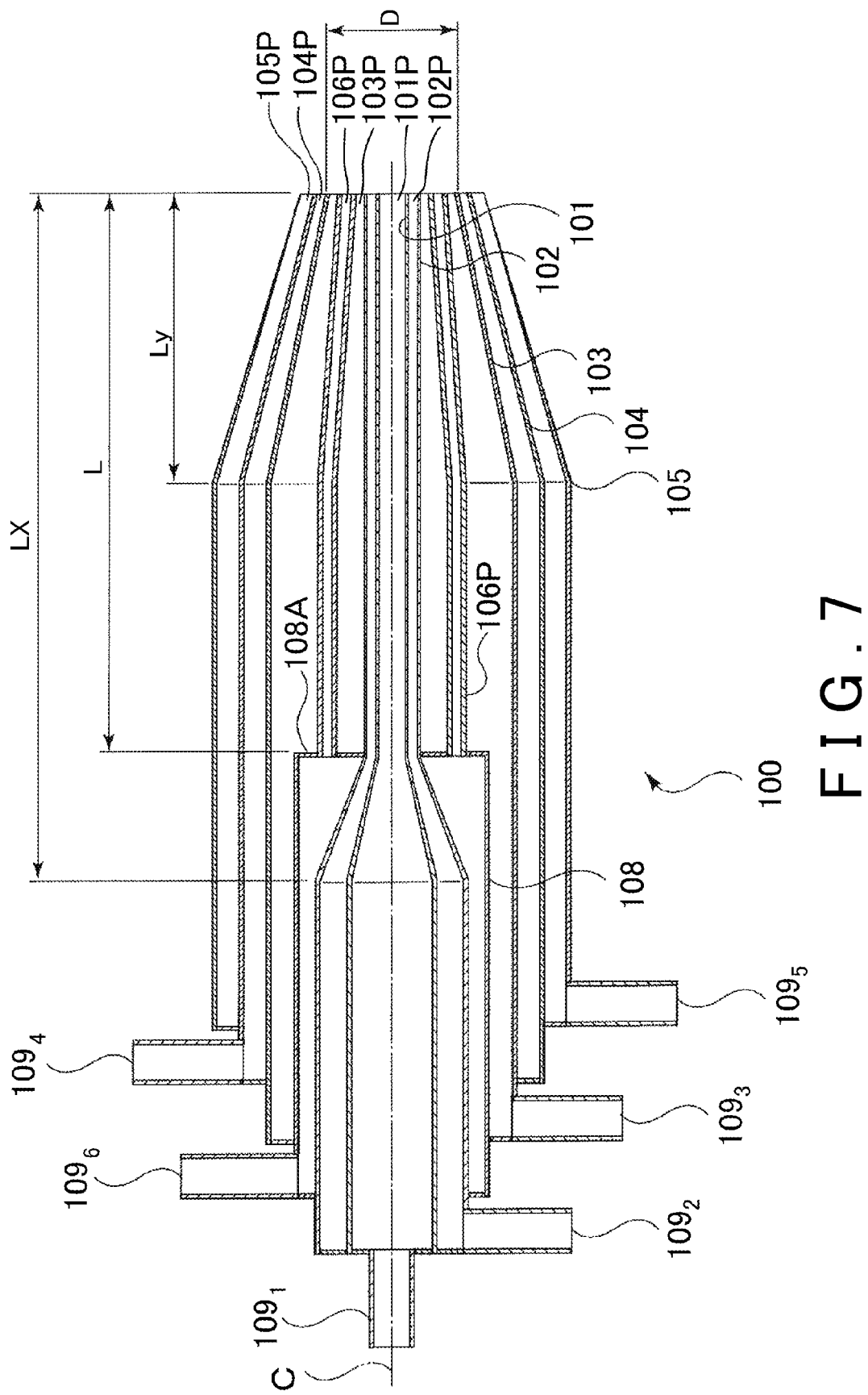
FIG. 7 is a schematic cross-sectional view showing an embodiment of the burner having the small-diameter gas discharge ports according to the present invention, which is used in the First Embodiment.

The following is a detailed description of an embodiment of a burner for manufacturing porous glass base material according to the present invention, and references FIG. 7.

The burner 100 of the present embodiment is configured with coaxial overlapping pipes that include a first pipe 101 having a raw material gas discharge port 101P formed in the center thereof, and around which is formed a plurality (second through fifth) of pipes 102, 103, 104, 105 which form a plurality (second through fifth) of coaxial annular gas discharge ports 102P, 103P, 104P, and 105P. The first through fifth pipes 102, 103, 104, and 105 have cross-sectional surfaces in the axial direction that are circular.

In the present embodiment, a first gas inlet pipe $109_1$ is disposed to be coaxial with the central first pipe 101 which forms the raw material gas discharge port 101 P (referred to hereinafter as the "first gas discharge port") centered on the axis C. The second pipe 102, the third pipe 103, the fourth pipe 104, and the fifth pipe 105 are sequentially arranged to be coaxial with the first pipe 101, and the second gas inlet pipe $109_2$, the third gas inlet pipe $109_3$, the fourth gas inlet pipe $109_4$, and the fifth gas inlet pipe $109_5$ are disposed on the source side of the burner 100 in directions orthogonal to the central axis C.

One main pipe 108 is arranged between the second pipe 102 and the third pipe 103, starting from the source side and extending to a position that is a prescribed length L from the tip of the burner 100. The main pipe 108 is closed at the position that is length L from the tip of the burner by a barrier 108A that is continuous with an inner periphery of the second pipe 102. A sixth gas inlet pipe $109_6$ is disposed at the source-side of the main pipe 108 in a direction orthogonal to the central axis C. Nozzles 106N, in which are formed a plurality of small-diameter gas discharge ports 106P at the position of the prescribed length L, branch from the barrier 108A of the main pipe 108. In the present embodiment, the small-diameter gas discharge port nozzles 106N are contained within the third gas discharge port 103P formed between the second pipe 102 and the third pipe 103, and are arranged at uniform intervals in a line around the central axis C of the first pipe 101 in which the raw material gas discharge port 101P is formed. In the present embodiment, there are eight nozzles. Each small-diameter gas discharge port nozzle 106N is bent inward in the radial direction in a manner to have the same focal distance on the central axis C. The small-diameter gas discharge port nozzles 106N may be arranged at uniform intervals in two lines on coaxial circles around the central axis C.

The first gas discharge port 101P and the second gas discharge port 102P, which are positioned farther outward in the radial direction than the third gas discharge port 103P that contains the small-diameter gas discharge port nozzles 106N, are formed such that, from a position at a length Lx that is farther toward the burner source side than the position that is length L from the tip, the inner diameter of the pipe in which the ports are formed begins to decrease, such that the inner diameter of the pipe is constant on the tip side of the length L position. In other words, the first pipe 101 and the second pipe 102, which are positioned farther inward than the third gas discharge port 103P containing the small-diameter gas discharge port nozzles 106N, have diameters that continuously decrease from the length Lx position to the length L position. When the inner diameters of the pipes on the burner 100 source side where the gas inlet pipes $109_1$ and $109_2$ are disposed are each represented as A and the inner diameter of these pipes on the burner 100 tip side are each represented as B, the pipes having the first and second gas discharge ports are formed to contract, such that the contraction ratio X of the inner diameters thereof each satisfy the expression $X=B/A \leq 0.83$.

On the other hand, the third gas discharge port 103P containing the small-diameter gas discharge port nozzles 106N and the fourth gas discharge port 104P and fifth gas discharge port 105P positioned outward in the radial direction from the third gas discharge port 103P have inner diameters that contract beginning from a length Ly position that is farther toward the burner tip side than the position that is length L from the tip. In other words, the third through fifth pipes 103 to 105 that are positioned outward from the small-diameter gas discharge port nozzles 106N have diameters that continuously decrease from the length Ly position to the burner 100 tip. When the inner diameters of the pipes from the length L position to the length Ly position are each represented as A and the inner diameter of these pipes at the burner 100 tip are each represented as B, the pipes having the third to fifth gas discharge ports 103P to 105P are formed to contract, such that the contraction ratio X of the inner diameters thereof each satisfy the expression $X=B/A \leq 0.83$.

When the third pipe 103, in which the third gas discharge port 103P is formed having the small-diameter gas discharge port nozzles 106N arranged therein, has an aperture diameter D, the third pipe 103 is formed such that the relationship between the aperture diameter D and the prescribed length L fulfils the condition $L/D \geq 2.0$. By having a sufficient length L for the small-diameter gas discharge port nozzles 106N, uniform linear velocity can be achieved for the gas flow around the small-diameter gas discharge port nozzles 106N.

In the present embodiment, the first and second pipes 101 and 102, which form the first and second gas discharge ports 101P and 102P positioned farther outward in the radial direction than the third gas discharge port 103P in which the small-diameter gas discharge port nozzles 106N are arranged, have contracted portions where the inner diameters thereof are contracted beginning at the length Lx position and ending at the length L position. In these contracted portions, the thickness of the pipes gradually decreases farther toward the burner 100 tip, and this decreased pipe thickness is maintained from the length L position to the burner 100 tip. Furthermore, the fifth pipe 105 which forms the fifth gas discharge port 105P has a contracted portion where the inner diameter thereof decreases from the length Ly position to the burner 100 tip, and in this contracted portion the pipe thickness decreases towards the burner 100 tip. This enables a more compact shape for the overall burner 100.

As shown in FIG. 14, a burner cover 110 is disposed on the outside of the fifth pipe 105, which is the outermost pipe of the burner 100, and is formed to have a constant clearance with respect to the fifth pipe 105. By providing this burner cover 110, the overall burner 100 can be made more compact.

The following describes an embodiment of the present invention and a comparative example, but the present invention is not limited to this embodiment.

EMBODIMENTS

Preliminary Investigation

Figure 1:
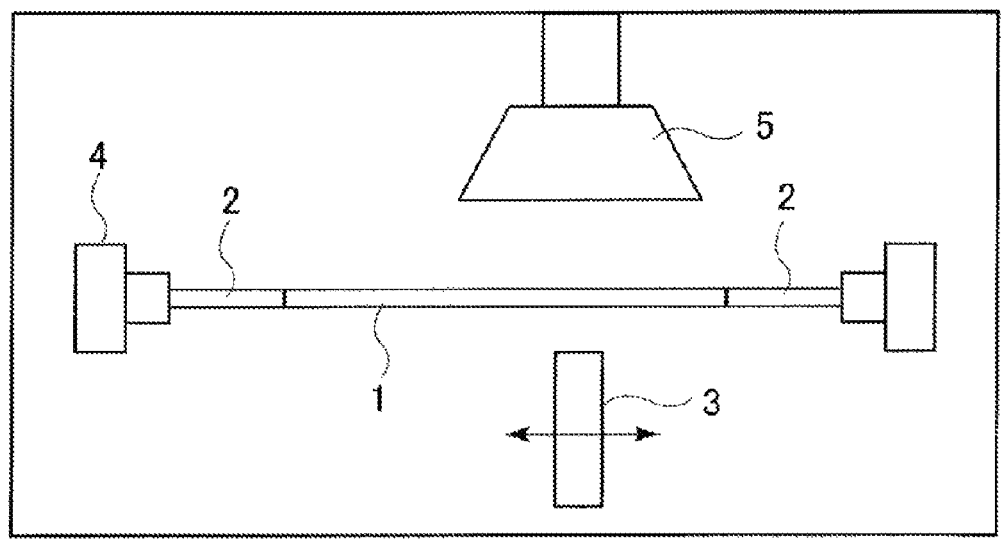
FIG. 1 is a schematic view showing an apparatus for manufacturing a porous glass base material using OVD.
Figure 2:
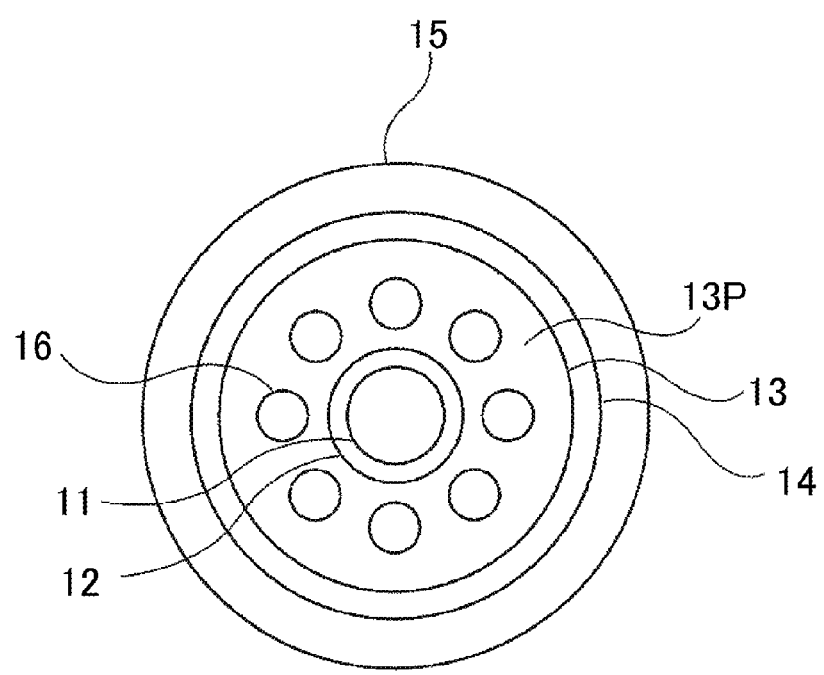
FIG. 2 is a schematic view showing the tip of a conventional burner for synthesizing glass fine particles having small-diameter gas discharge ports.
Figure 3:
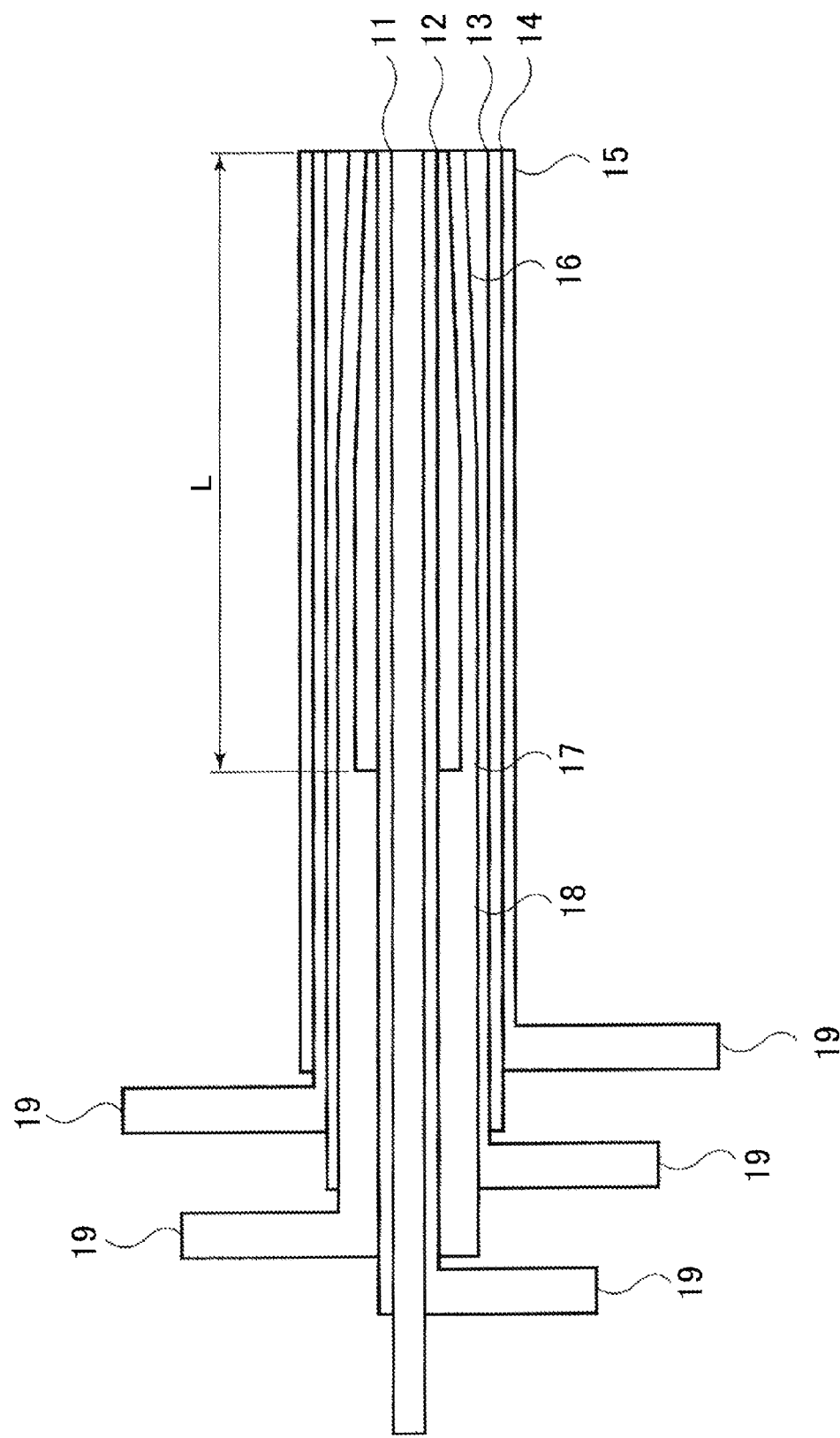
FIG. 3 is a schematic cross-sectional view showing a conventional burner having small-diameter gas discharge ports.

First, in the preliminary investigation, variation of linear velocity at the tip of a conventional burner, such as shown schematically in FIGS. 2 and 3, was measured for each gas discharge port.

This burner has a coaxial pipe structure, wherein eight small-diameter gas discharge port nozzles 16 are contained in a third pipe 13 and these small-diameter gas discharge port nozzles 16 are arranged at uniform intervals in a circle centered on a central pipe 11. As shown in FIG. 3, a small-diameter gas discharge port nozzle 16 is formed to branch from the burner main pipe 18 at a position, shown by the reference numeral 17, that is L=80 mm from the burner tip.

A gas for manufacturing porous glass base material was supplied to pipes other than the central pipe 11 of the burner, and a hot wire anemometer was used to measure the variation of linear velocity at the burner tip at a normal temperature. The gas was $N_2$ supplied as a sealing gas to the second pipe 12 at 4 L/min, $H_2$ supplied as a combustion gas to the third pipe 13 at 170 L/min, $N_2$ supplied as a sealing gas to the fourth pipe 14 at 5 L/min, and $O_2$ supplied as an auxiliary combustion gas to the fifth pipe 15 at 40 L/min.

Figure 4:
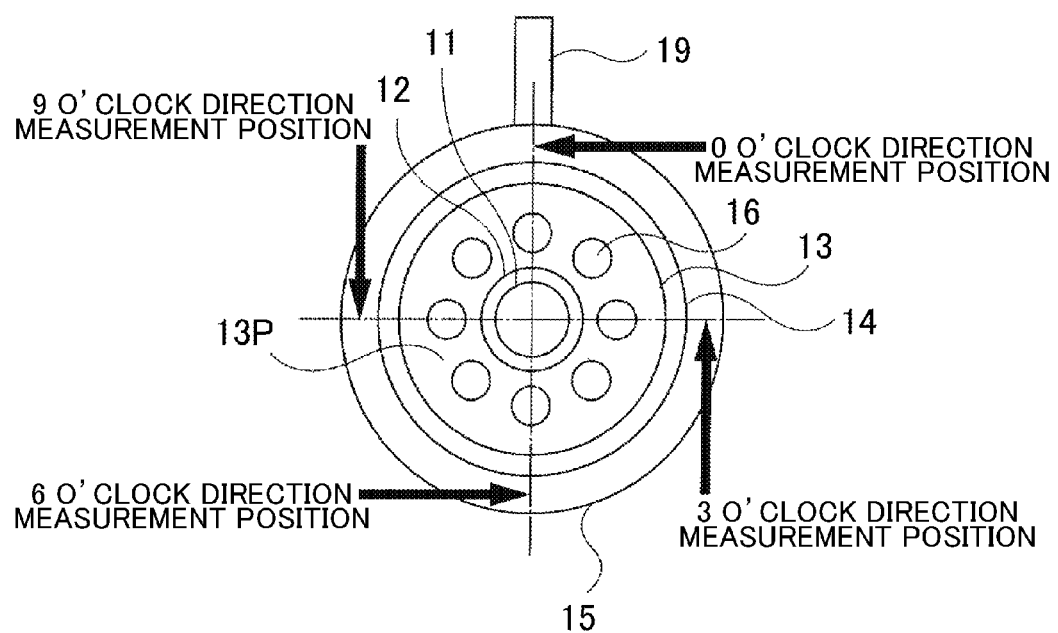
FIG. 4 is a schematic view describing measurement positions for linear velocity variation of gas at the burner tip, with the position of the gas inlet pipe as a reference.
Figure 5:
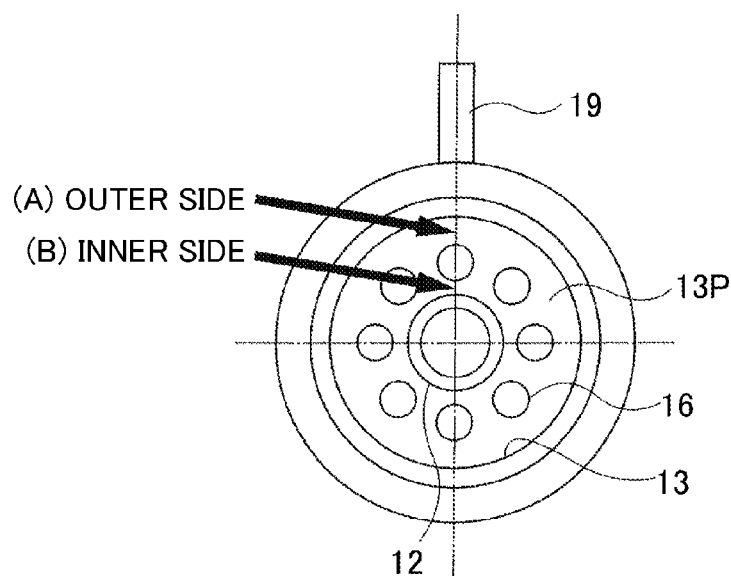
FIG. 5 is a schematic view describing measurement positions for linear velocity variation of the gas discharge port containing the small-diameter gas discharge ports.

As shown in FIG. 4, the linear velocity was measured when the gas inlet pipe 19 was oriented at four positions: a 0 o'clock direction, a 3 o'clock direction, a 6 o'clock direction, and a 9 o'clock direction, which each differ by 90 degrees. For each direction shown in FIG. 5, the upper side and the lower side (the outer side and the inner side in the radial direction) of the small-diameter gas discharge port nozzles were measured for the gas discharge port 13P of the third pipe 13 containing the small-diameter gas discharge port nozzles 16. The results are shown in FIG. 6.

Figure 6:
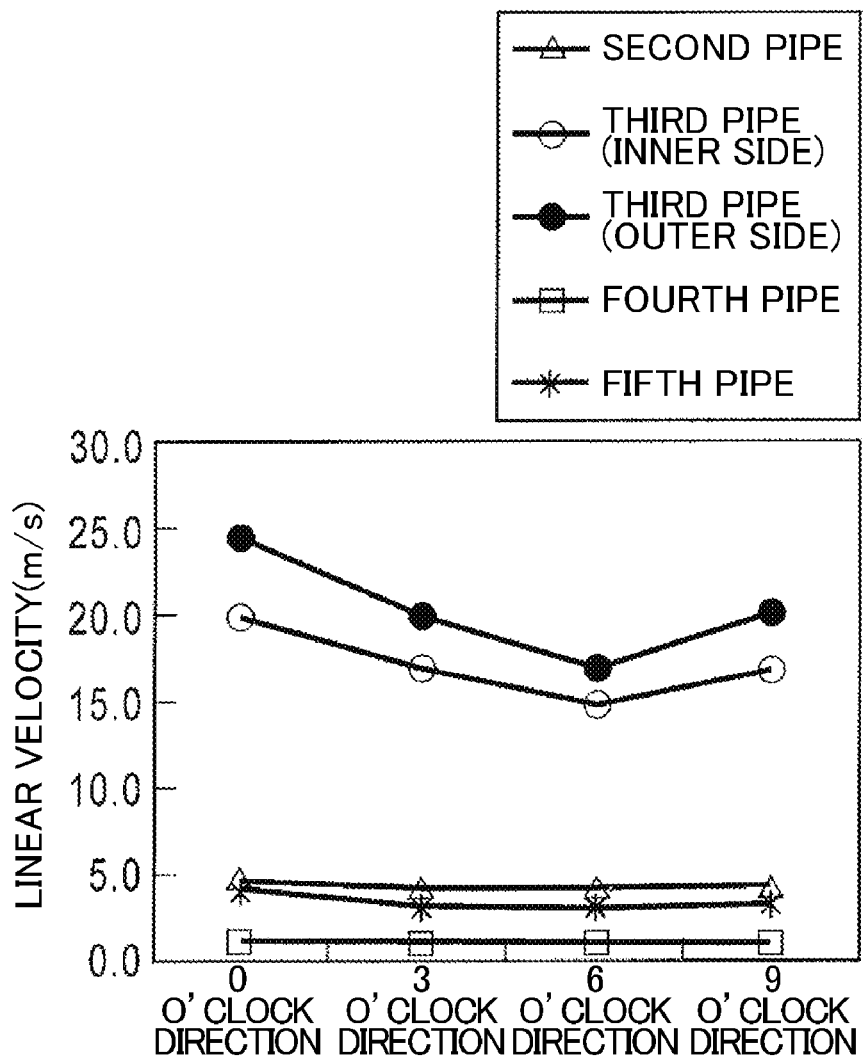
FIG. 6 shows the linear velocity variation of a conventional burner having the small-diameter gas discharge ports.

From FIG. 6 it is understood that, for each gas discharge port, the gas linear velocity on the gas inlet pipe 19 side (0 o'clock direction) is high and the gas linear velocity on the other side of the inner pipe (6 o'clock direction) is low.

First Embodiment

FIG. 7 is used to describe a burner 100 having a structure of five coaxial pipes according to an embodiment of the present invention. In this burner 100, eight small-diameter gas discharge port nozzles 106N are contained in a third pipe 103, the small-diameter gas discharge port nozzles 106N are arranged to branch from the main pipe 108 at a position that is L=80 mm from the burner 100 tip as shown in FIG. 7, the aperture diameter of the third pipe 103 is 40 mm, and L/D=2.0.

The first pipe 101 and second pipe 102, which are farther inward than the small-diameter gas discharge port 106P, have inner diameters that begin contracting to be 83% of their original size at a certain distance, i.e. a length Lx=120 mm, from the burner 100 tip, and the third to fifth pipes farther outside from the small-diameter gas discharge port 106P have inner diameters that begin decreasing to be 83% of their original size at a certain distance, i.e. a length Ly=40 mm, from the burner 100 tip. The flow rate and type of the gas supplied to each of the gas discharge ports 101P to 106P was the same as in the preliminary investigation, and the linear velocity variation was measured at a normal temperature.

Figure 8:
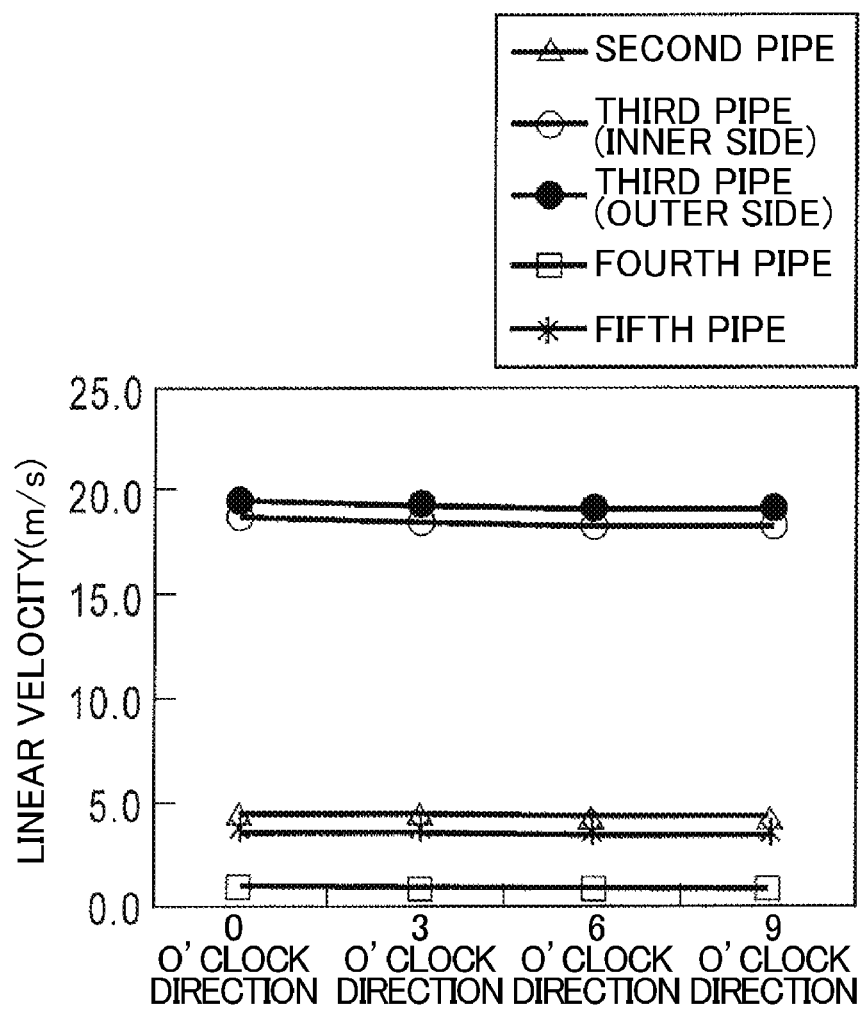
FIG. 8 shows linear velocity variation of the burner used in the First Embodiment.

The results are shown in FIG. 8, and in comparison to the preliminary investigation shown in FIG. 6, show a more uniform linear velocity variation for each gas discharge port. As shown by the thick arrows in FIG. 9, the gas flowing in the third pipe 103 was confirmed to have sufficiently moved around the back side of the small-diameter gas discharge port nozzles 106N until reaching the burner 100 tip.

Next, the inner diameters of the pipes on the source side of the burner 100 for which the linear velocity variation measurement was performed were changed, without changing the inner diameters of the pipes on the tip side of the burner 100 or the position where the inner diameters begin to contract. As a result, the contraction ratio X (B/A) of the inner diameters of the pipes was changed in a range from 0.7 to 1.0, glass fine particle deposition was performed, and the deposition efficiency was calculated.

In the burner 100, the first pipe 101 was supplied with $SiCl_4$ as the glass raw material at 10 L/min and $O_2$ as an auxiliary combustion gas at 20 L/min, the second pipe 102 was supplied with $N_2$ as a sealing gas at 4 L/min, the third pipe 103 was supplied with $H_2$ as a combustible gas at 170 L/min, the fourth pipe 104 was supplied with $N_2$ as a sealing gas at 5 L/min, the fifth pipe 105 was supplied with $O_2$ as an auxiliary combustion gas at 40 L/min, and the main pipe 108 of the small-diameter gas discharge port nozzles 106N was supplied with $O_2$ as an auxiliary combustion gas at 16 L/min. Using these gases, 100 kg of glass fine particles were deposited on a starting member that was formed by fusing dummy rods with outer diameters of 50 mm to the ends of a core rod that has a length of 2000 mm and an outer diameter of 50 mm.

Figure 10:
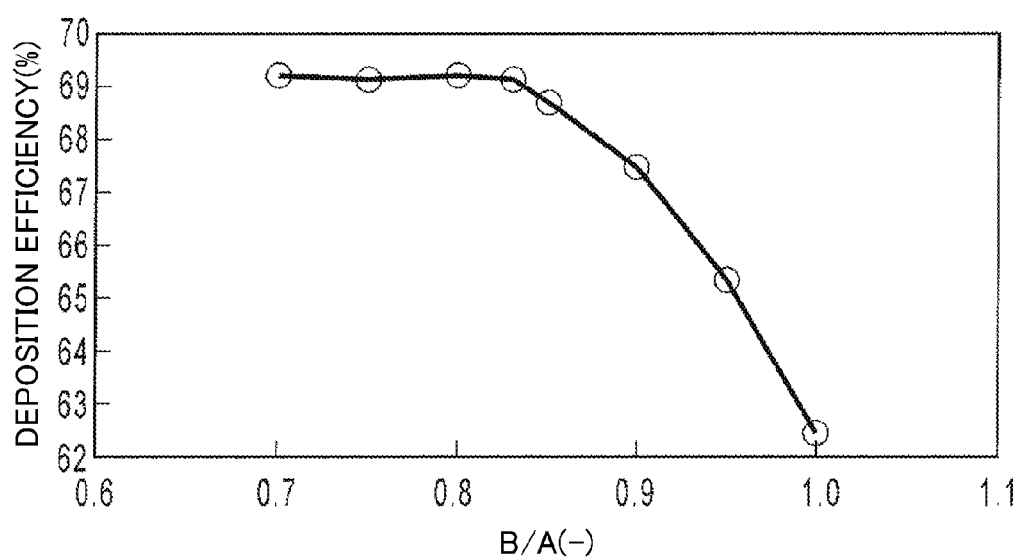
FIG. 10 shows the relationship between the contraction ratio X (B/A) of the inner diameters of the pipes and the deposition efficiency.

As shown in FIG. 10, the results indicate that when the contraction ratio is 0.83 or less, the linear velocity of the gas becomes uniform, the flame is stabilized, and the deposition efficiency becomes highly stable.

Comparative Example 1

The burner 100 for which linear velocity was measured in the First Embodiment having an L/D ratio of 2.0 and a burner 100' having the same source diameter, tip diameter, and contraction position but having an L/D ratio of 1.5 as a result of setting the length L of the small-diameter gas discharge port nozzles 106N to be 60 mm were prepared. The flow rate and type of the gas provided to each gas discharge port was the same as in the preliminary investigation, and the linear velocity variation was measured for each burner at a normal temperature.

Figure 12:
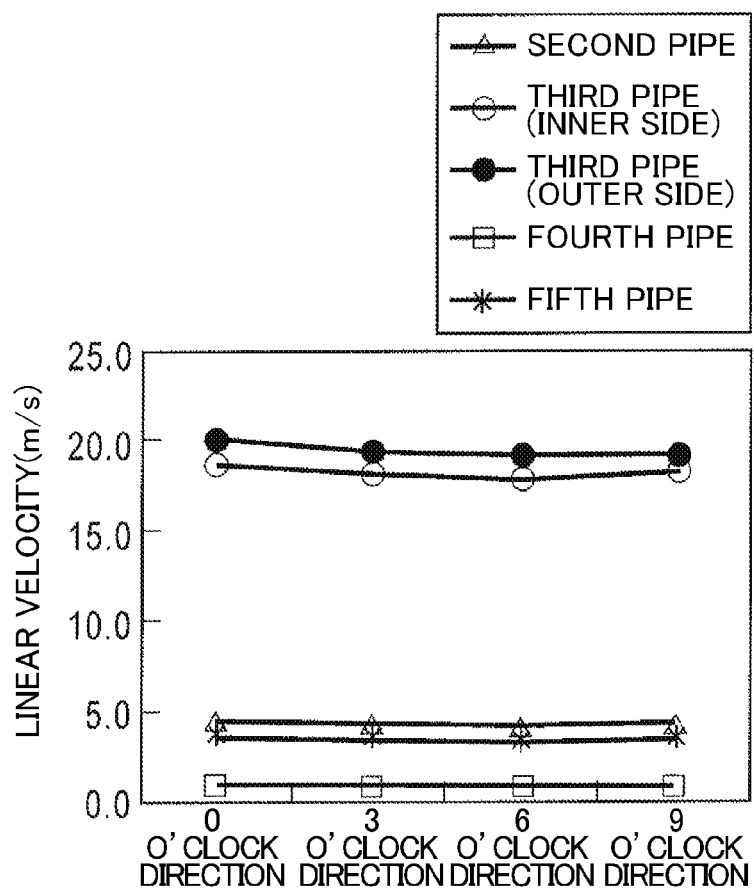
FIG. 12 shows the linear velocity variation of the burner when the L/D ratio is low.

As a result, upon comparing the burner 100' in which L/D=1.5 to the burner 100 in which L/D=2.0 and whose linear velocity variation measurement results are shown in FIG. 8, it was found that the burner 100' had a larger linear velocity difference between the region inside the third pipe 103 and the region outside the third pipe 103, i.e. above and below the small-diameter gas discharge ports, as shown in FIGS. 11 and 12. This is assumed to be because, since the length L of the small-diameter gas discharge port nozzles 106N is insufficient relative to the aperture diameter D of the gas discharge port 103P containing the small-diameter gas discharge port nozzles 106N, the gas reaches the tip of the burner 100 without passing around inside the small-diameter gas discharge port nozzles 106N.

Second Embodiment

The length L of the small-diameter gas discharge port nozzles 106N of the burner 100' with L/D=1.5 used in Comparative Example 1 was changed while keeping the same burner source diameter, burner tip diameter, and contraction position to obtain a burner 100" having a different L/D ratio between the length L of the small-diameter gas discharge port nozzles 106N and the aperture diameter D of the third pipe 103. Next, 100 kg of glass fine particles were deposited on a starting member that was formed by fusing dummy rods with outer diameters of 50 mm to the ends of a core rod that has a length of 2000 mm and an outer diameter of 50 mm. FIG. 13 shows the relationship between L/D and the deposition efficiency.

In the burner 100", the first pipe 101 was supplied with $SiCl_4$ as the glass raw material at 10 L/min and $O_2$ as an auxiliary combustion gas at 20 L/min, the second pipe 102 was supplied with $N_2$ as a sealing gas at 4 L/min, the third pipe 103 was supplied with $H_2$ as a combustible gas at 170 L/min, the fourth pipe 104 was supplied with $N_2$ as a sealing gas at 5 L/min, the fifth pipe 105 was supplied with $O_2$ as an auxiliary combustion gas at 40 L/min, and the main pipe 108 of the small-diameter gas discharge port nozzles 106N was supplied with $O_2$ as an auxiliary combustion gas at 16 L/min.

The results as shown in FIG. 13 indicate that, if the expression $L/D \geq 2.0$ is satisfied, a stable deposition efficiency can be achieved since the small-diameter gas discharge port nozzles 106N have sufficient length.

The above embodiments of the present invention achieve advantageous effects such as the gas flow emitted from the burner having a uniform linear velocity at the gas discharge ports, a stable flame, and improved deposition efficiency of the generated glass fine particles.

Usually, the gas introduced to the gas discharge ports from the gas inlet pipes has a linear velocity variation within the annular flow path. The gas introduced from a direction orthogonal to the axis of the gas discharge ports changes direction after colliding with a wall of an inner pipe within the burner and moves toward the tip of the burner, and so it is difficult for this gas to pass around the opposite side, i.e. the back, of the inner pipe. As a result, the linear velocity is larger on the gas inlet pipe side and smaller on the back sides of the inner pipes. However, by adopting the configuration of the above embodiments in which the inner diameters of the pipes contract until reaching the gas discharge ports, even when there are inner pipes, the gas flow within the annular flow path collides with an inner wall that is slanted relative to the axial direction and disperses. Therefore, by making it easier for the introduced gas to reach the backs of the inner pipes, the linear velocity variation in the annular flow path can be restricted.

Concerning the gas discharge ports positioned farther outward than the gas discharge port that contain the small-diameter gas discharge port nozzles, by contracting the flow path in the same location as the gas discharge port containing the small-diameter gas discharge port nozzles, the linear velocity can be made uniform within the gas discharge ports, without increasing the size of the burner. On the other hand, by contracting the inner diameters of pipes forming the gas discharge ports positioned farther inward than the small-diameter gas discharge port nozzles at a portion of the main pipe before it branches into the small-diameter gas discharge port nozzles, i.e. a position farther on the burner source side than the branching point, the gas flow can be dispersed in the flow path, the linear velocity variation can be restricted, and the diameters of the inner pipes passing through the branching portion can be decreased. As a result, the space between the branched small-diameter gas discharge port nozzles can be filled to make the overall burner more compact.

If the pipes forming the gas discharge ports positioned farther inward than the small-diameter gas discharge port nozzles contract at a position farther on the burner tip side than the branching point, the gas flow in the contracted portion is diffused and the linear velocity variation is restricted, but since the diameter of the inner pipes is still large the space between the small-diameter gas discharge port nozzles after branching cannot be filled, and so this space must be increased. As a result, the gas discharge port containing the small-diameter gas discharge port nozzles and the pipes farther outward are thicker, which causes the burner to be undesirably large.

By setting the small-diameter gas discharge ports in the same row in the small-diameter gas discharge port nozzles to have the same focal distances, the gas emitted from the gas discharge ports can be focused on a single target point, thereby increasing the reactivity of the gas. Accordingly, the deposition efficiency of the porous glass can be improved.

Here, the contraction ratio of the inner diameters of the pipes forming the gas discharge ports is important, and with the inner diameters of the pipes on the burner source side represented as A and the inner diameters of the pipes on the burner tip side represented as B, setting this contraction ratio X such that $X=B/A \leq 0.83$ causes the gas used for manufacturing the porous glass base material to have a more uniform linear velocity. A higher flow rate for the gas introduced to the annular flow path tends to result in less linear velocity variation, and so the contraction ratio X should be larger for higher flow rates. When the pipes forming the gas discharge ports are cylindrical, the diameter thereof in a cross section in the axial direction is uniform, and so the contraction ratio X for each pipe is a ratio between the diameter A of the pipe on the burner source side and the diameter B of the pipe on the burner tip side. If the pipes forming the gas discharge ports have cross sections that are ellipses or polygons, the diameter of the cross section in the axial direction differs depending on the position around the center. In this case, the contraction ratio X can be a value obtained by comparing the diameter of the pipe at any location around the center on the burner source side (A) to the identically measured diameter on the burner tip side (B).

Depending on the type and flow rate of the inducted gas, if the length L of the small-diameter gas discharge port nozzles is short even though the inner diameter of the pipe is contracted, the gas flowing around the small-diameter gas discharge port nozzles has different linear velocity in the inner pipes than in the outer pipes of the flow path, causing a linear velocity variation (FIG. 11). This variation is due to the length L of the small-diameter gas discharge port nozzles being too small with respect to the aperture diameter of the gas discharge port containing the small-diameter gas discharge port nozzles.

Figure 9:
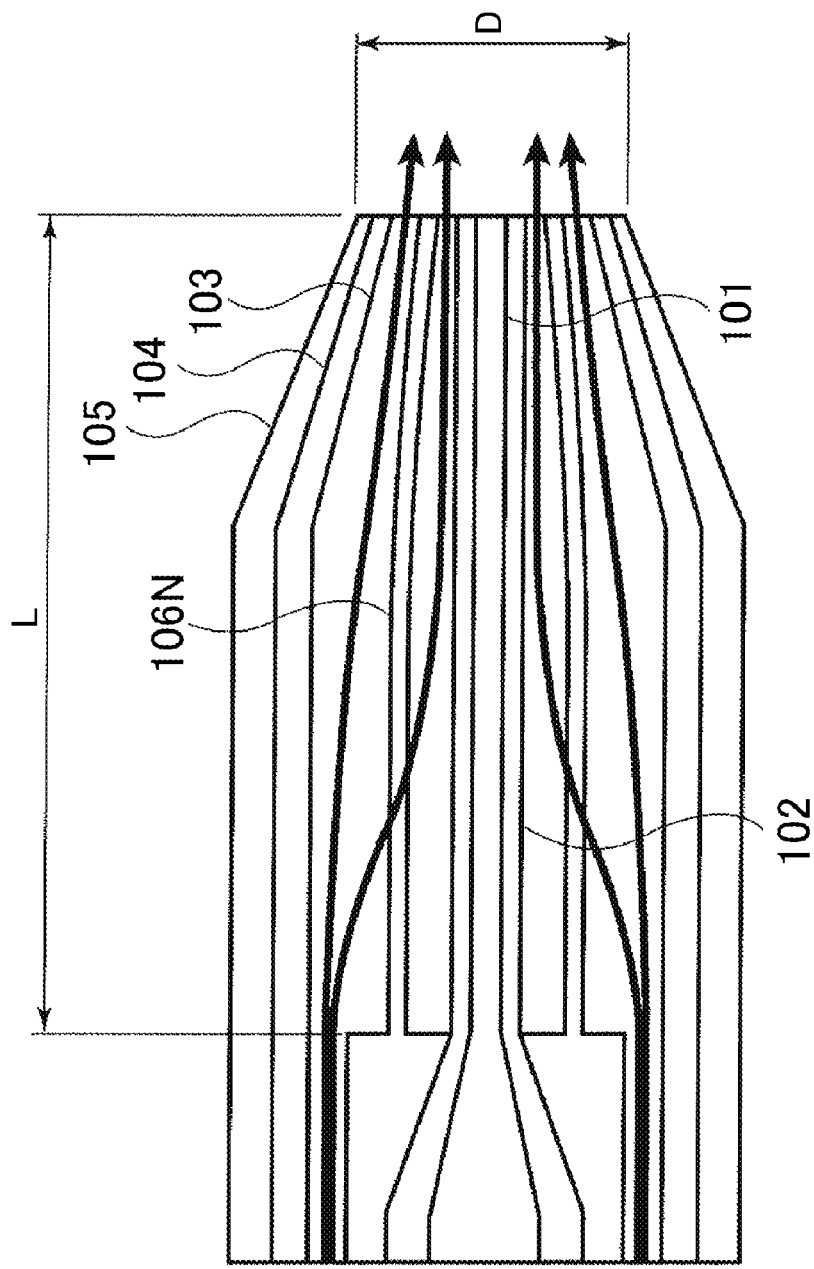
FIG. 9 is a schematic view showing the state of gas flow in the third pipe of the burner used in the First Embodiment.

If the length L of the small-diameter gas discharge port nozzles is sufficient with respect to the aperture diameter of the gas discharge port containing the small-diameter gas discharge port nozzles, the gas moves inward in the radial direction of the small-diameter gas discharge port nozzles until reaching the burner tip, and this decreases the difference in linear velocity around the small-diameter gas discharge port nozzles (FIG. 9). On the other hand, if the length L of the small-diameter gas discharge port nozzles is insufficient with respect to the aperture diameter of the gas discharge port containing the small-diameter gas discharge port nozzles as described above, the gas does not move inward in the radial direction of the small-diameter gas discharge port nozzles until reaching the burner tip. As a result, the linear velocity inside the small-diameter gas discharge port nozzles is decreased, causing a large difference in the overall linear velocity.

With the aperture diameter of the gas discharge port containing the small-diameter gas discharge port nozzles represented as D, sufficient length L for the small-diameter gas discharge port nozzles can be achieved by setting the length L from the branching point to the burner tip such that $L/D \geq 2.0$, and this causes the linear velocity of the gas flowing around the small-diameter gas discharge port nozzles to be uniform.

The burner source side must be sturdy since the burner is fixed to a holding device, and the burner tip side must have pipes with contracting inner diameters. Therefore, the pipes positioned farther inward than the gas discharge port containing the small-diameter gas discharge port nozzles preferably become thinner from the portion where the inner diameter begins to contract to the burner tip.

The burner tip side of the outermost pipe of the burner is tapered due to the contraction of the inner diameters of the pipes. Therefore, the burner cover also contracts to maintain a prescribed clearance with respect to the outermost pipe of the burner.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a burner that achieves a stable flame, improves the glass fine particle deposition efficiency, and significantly improves the ability to produce porous glass base material.

What is claimed is:

1. A burner for manufacturing porous glass base material, comprising:
   a central pipe that is arranged centrally and has a central raw material gas discharge port formed therein;
   a plurality of pipes that are coaxial with the central pipe and that form annular gas discharge ports between adjacent pipes; and
   a plurality of small-diameter gas discharge port nozzles that (i) are arranged in one or more rows in a circle coaxial with the central pipe within one of the gas discharge ports other than the central raw material gas discharge port, (ii) have small-diameter gas discharge ports formed therein, and (iii) branch from one main pipe arranged between a pair of pipes forming the gas discharge port in which the nozzles are arranged, at a position that is a prescribed length L from tips of the nozzles, wherein
   inner diameters of the pipes forming the gas discharge ports positioned farther inward in a radial direction than the gas discharge ports in which the small-diameter gas discharge port nozzles are arranged contract beginning from a position farther on a burner source side than the prescribed length L position, the contraction being greater closer to a burner tip side and within the one main pipe arranged between a pair of pipes forming the gas discharge port in which the nozzles are arranged, and inner diameters of the pipes forming the gas discharge port in which the small-diameter gas discharge port nozzles are arranged and the gas discharge ports that are positioned farther outward in the radial direction than this gas discharge port contract beginning from a position farther on a burner tip side than the prescribed length L position, the contraction being greater closer to a burner tip side.

2. The burner for manufacturing porous glass base material according to claim 1, wherein in the small-diameter gas discharge port nozzles, small-diameter gas discharge ports in the same row have identical focal distances.

3. The burner for manufacturing porous glass base material according to claim 1, wherein (i) the inner diameters of the pipes forming the gas discharge ports positioned farther inward in the radial direction than the gas discharge port in which the small-diameter gas discharge port nozzles are arranged and (ii) the inner diameters of the pipes forming the gas discharge port in which the small-diameter gas discharge port nozzles are arranged and the gas discharge ports that are positioned farther outward in the radial direction than this gas discharge port contract from the burner source side toward the burner tip side with a prescribed contraction ratio X, such that $X \leqq 0.83$.

4. The burner for manufacturing porous glass base material according to claim 1, wherein with an aperture diameter of the outer pipe forming the gas discharge port in which the small-diameter gas discharge port nozzles are arranged being represented as D, a relationship between the prescribed length L and the aperture diameter D fulfills an expression $L/D \geqq 2.0$.

5. The burner for manufacturing porous glass base material according to claim 1, wherein at least the pipes forming the gas discharge ports positioned farther inward in the radial direction than the gas discharge port in which the small-diameter gas discharge port nozzles are arranged are formed to be thinner closer to the burner tip side, in the portions where the inner diameters contract.

6. The burner for manufacturing porous glass base material according to claim 1, wherein a burner cover is disposed on an outer side of the outermost pipe of the burner, and is formed to maintain a prescribed clearance relative to the outermost pipe of the burner.

* * * * *